US011497000B2

(12) United States Patent
Wu et al.

(10) Patent No.: US 11,497,000 B2
(45) Date of Patent: Nov. 8, 2022

(54) USER EQUIPMENT BASED NETWORK-ASSISTED SCHEDULING FOR SIDELINK UNICAST COMMUNICATIONS

(71) Applicant: QUALCOMM Incorporated, San Diego, CA (US)

(72) Inventors: Zhibin Wu, Sunnyvale, CA (US); Hong Cheng, Bridgewater, NJ (US); Kapil Gulati, Hillsborough, NJ (US); Sudhir Kumar Baghel, Hillsborough, NJ (US); Junyi Li, Chester, NJ (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 706 days.

(21) Appl. No.: 16/424,239

(22) Filed: May 28, 2019

(65) Prior Publication Data

US 2022/0322369 A1    Oct. 6, 2022

Related U.S. Application Data

(60) Provisional application No. 62/735,735, filed on Sep. 24, 2018.

(51) Int. Cl.
*H04W 72/04* (2009.01)
*H04W 72/12* (2009.01)
(Continued)

(52) U.S. Cl.
CPC ....... *H04W 72/0406* (2013.01); *H04L 5/0053* (2013.01); *H04W 8/18* (2013.01);
(Continued)

(58) Field of Classification Search
CPC ... H04W 72/0406; H04W 76/14; H04W 8/18; H04W 28/0278; H04W 48/08;
(Continued)

(56) References Cited

U.S. PATENT DOCUMENTS

2016/0183121 A1* 6/2016 Kazmi ............... H04L 41/0803
370/230
2017/0331593 A1* 11/2017 Sorrentino ........... H04L 1/0026
(Continued)

FOREIGN PATENT DOCUMENTS

EP    3110052 A1    12/2016
EP    3386256 A1    10/2018
WO   2017128275 A1   8/2017

OTHER PUBLICATIONS

International Search Report and Written Opinion—PCT/US2019/045072—ISAEPO—dated Jun. 8, 2020.

*Primary Examiner* — Hirdepal Singh
(74) *Attorney, Agent, or Firm* — Loza & Loza, LLP

(57) ABSTRACT

Aspects directed towards network-assisted sidelink scheduling are disclosed. In one example, a scheduled entity receives coverage status information of a peer user equipment (UE), and transmits a coverage status report to a network in which the coverage status report is based on the coverage status information received from the peer UE. The scheduled entity receives a resource scheduling from the network in response to transmitting the coverage status report, and establishes a sidelink communication with the peer UE based on the resource scheduling. In another example, a scheduling entity receives a coverage status report from a UE in which the coverage status report is associated with a peer UE of the UE. The scheduling entity determines a resource scheduling for the UE based on the coverage status report to facilitate a sidelink communication between the UE and the peer UE, and transmits the resource scheduling to the UE.

30 Claims, 11 Drawing Sheets

(51) Int. Cl.
  *H04W 28/02* (2009.01)
  *H04W 48/08* (2009.01)
  *H04W 76/14* (2018.01)
  *H04L 5/00* (2006.01)
  *H04W 8/18* (2009.01)
  *H04W 92/18* (2009.01)
  *H04W 88/04* (2009.01)

(52) U.S. Cl.
  CPC ....... *H04W 28/0278* (2013.01); *H04W 48/08* (2013.01); *H04W 72/1278* (2013.01); *H04W 76/14* (2018.02); *H04W 88/04* (2013.01); *H04W 92/18* (2013.01)

(58) Field of Classification Search
  CPC . H04W 72/1278; H04W 88/04; H04W 92/18; H04L 5/0053
  USPC ........................................................ 455/450
  See application file for complete search history.

(56) References Cited

U.S. PATENT DOCUMENTS

| | | | |
|---|---|---|---|
| 2018/0234913 A1* | 8/2018 | Kahtava | H04W 8/005 |
| 2018/0376525 A1* | 12/2018 | Feng | H04L 27/0014 |
| 2020/0296745 A1* | 9/2020 | Inokuchi | H04W 72/1268 |

* cited by examiner

FIG. 7

2+N octets

| Destination Index (5-bit) | LCGID (3-bit) |
| Buffer Size (8-bit) |
| Assistance Info for Grant (N octets) |

USER EQUIPMENT BASED NETWORK-ASSISTED SCHEDULING FOR SIDELINK UNICAST COMMUNICATIONS

The application claims priority to and the benefit of U.S. provisional patent application No. 62/735,735 filed on Sep. 24, 2018, the entire content of which is incorporated herein by reference as if fully set forth below in its entirety and for all applicable purposes.

TECHNICAL FIELD

The technology discussed below relates generally to wireless communication systems, and more particularly, to a user equipment based network-assisted scheduling for sidelink unicast communications.

INTRODUCTION

As the demand for mobile broadband access continues to increase, research and development continue to advance wireless communication technologies not only to meet the growing demand for mobile broadband access, but to advance and enhance the user experience with mobile communications. Advances with respect to sidelink communications have been particularly desirable in recent years. Sidelink communications were initially introduced as a Long Term Evolution (LTE) feature directed towards enabling device-to-device (D2D) communications within legacy cellular-based LTE radio access networks. For comparison, in a legacy uplink/downlink based communication, two mobile devices may communicate through an interface in which data traverses the network via a base station, whereas a sidelink communication enables a direct communication between proximal mobile devices using a different interface in which the data does not need to go through the network.

Sidelink communications will continue to be supported by 5G New Radio (NR) networks. With respect to unicast sidelink communications, however, scheduling is particularly challenging. Namely, because unicast communications generally cause high traffic demand and resource usage, an improved scheduling methodology for unicast sidelink communications in NR may be desired.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects directed towards a scheduled entity (e.g., a user equipment (UE)) are disclosed. In a particular example, a method is disclosed, which may include receiving coverage status information associated with a peer UE from the peer UE, and transmitting a coverage status report associated with the peer UE to a network in which the coverage status report is based on the coverage status information received from the peer UE. The method may also include receiving a resource scheduling from the network in response to the transmitting of the coverage status report, and establishing a sidelink communication with the peer UE based on the resource scheduling received from the network.

In another aspect, a scheduled entity is disclosed. The scheduled entity can include a processor communicatively coupled to each of a coverage circuitry, a reporting circuitry, a scheduling circuitry, and a sidelink circuitry. For this example, the coverage circuitry can be configured to receive coverage status information associated with a peer UE from the peer UE, whereas the reporting circuitry can be configured to transmit a coverage status report associated with the peer UE to a network in which the coverage status report is based on the coverage status information received from the peer UE. The scheduling circuitry can be configured to receive a resource scheduling from the network in response to transmitting the coverage status report, and the sidelink circuitry can be configured to establish a sidelink communication with the peer UE based on the resource scheduling received from the network.

Various aspects directed towards a scheduling entity (e.g., a base station) are also disclosed. In a particular example, a method is disclosed, which may include receiving a coverage status report from a UE in which the coverage status report is associated with a peer UE of the UE. The method may further include determining a resource scheduling for the UE based on the coverage status report in which the resource scheduling facilitates a sidelink communication between the UE and the peer UE, and transmitting the resource scheduling to the UE.

In another aspect, a scheduling entity is disclosed. A scheduling entity can include a processor communicatively coupled to each of a receiving circuitry, a scheduling circuitry, and a transmitting circuitry. For this example, the receiving circuitry can be configured to receive a coverage status report from a UE in which the coverage status report is associated with a peer UE of the UE. The scheduling circuitry can be configured to determine a resource scheduling for the UE based on the coverage status report in which the resource scheduling facilitates a sidelink communication between the UE and the peer UE. The transmitting circuitry can be configured to transmit the resource scheduling to the UE.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 7 is a block diagram illustrating exemplary contents of a buffer status report (BSR) in accordance with aspects disclosed herein.

DETAILED DESCRIPTION

Figure 1:
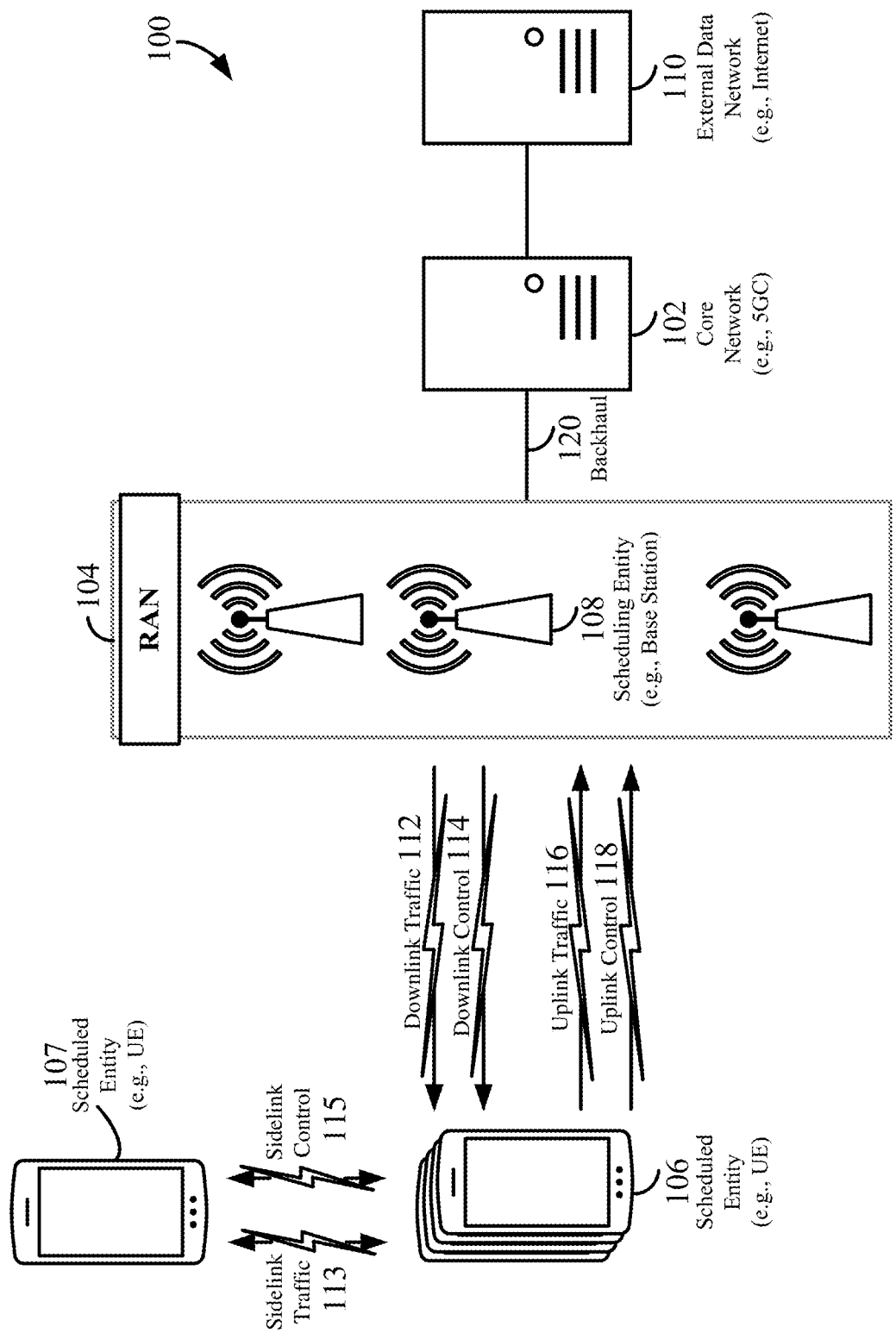
FIG. 1 is a schematic illustration of a wireless communication system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects disclosed herein are directed towards a user equipment (UE) based network-assisted scheduling for sidelink unicast communications. As previously stated, because unicast communications generally cause high traffic demand and resource usage, it is anticipated that scheduling unicast sidelink communications in 5G New Radio (NR) networks will be particularly challenging. Accordingly, aspects disclosed herein are generally directed towards scheduling unicast sidelink communications in NR, and more specifically towards a UE-based network-assisted scheduling for sidelink unicast communications. For instance, in a particular aspect, such scheduling is based on information received by a UE from a peer UE, which is subsequently reported to the gNB serving the UE. The information forwarded by the UE may, for example, include scheduling information provided by the peer UE, which the gNB may then use for scheduling a sidelink communication between the UE and peer UE.

Various aspects disclosed herein may use certain acronyms by way of example and for the sake of brevity. It should be understood, however, that claimed subject matter may not necessarily be intended to be limited by such acronyms. Indeed, it should be understood that certain acronyms may correspond to various or multiple different aspects, technologies, devices, etc. By way of some early examples, a radio access technology (RAT), may correspond to various types of technology or communication standards utilized for radio access and communication over a wireless air interface. Just a few examples of RATs include Global System for Mobile (GSM), Universal Terrestrial Radio Access (UTRA), Evolved UTRA (E-UTRA), Bluetooth, and Wi-Fi. Similarly, 5G New Radio (NR) may generally refer to 5G technologies and the new radio access technology undergoing definition and standardization by the 3rd Generation Partnership Project (3GPP) since Release 15.

In another example, orthogonal frequency division multiplexing (OFDM) may generally correspond to air interface(s) that may be defined according to a two-dimensional grid of resource elements, defined by separation of resources in frequency by defining a set of closely spaced frequency tones or sub-carriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

In still another example, device-to-device (D2D) communication may correspond in general to various point-to-point (P2P) or other like techniques. In certain instances, D2D technology may enable discovery of, and communication with nearby devices (mobile or stationary) using a direct link between the devices (i.e., without data passing through a base station, relay, or other node). D2D technology may, for example, enable mesh networks, device-to-network relay functionality, and/or the like. Some examples of D2D technology may even include Bluetooth pairing, Wi-Fi Direct, Miracast, LTE-D, etc.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a UE 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3GPP NR specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as a UE in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant Quality of Service (QoS) for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5G core (5GC)). In other examples, the core network 102 may be configured according to a 4G evolved packet core (EPC), or any other suitable standard or configuration.

Figure 2:
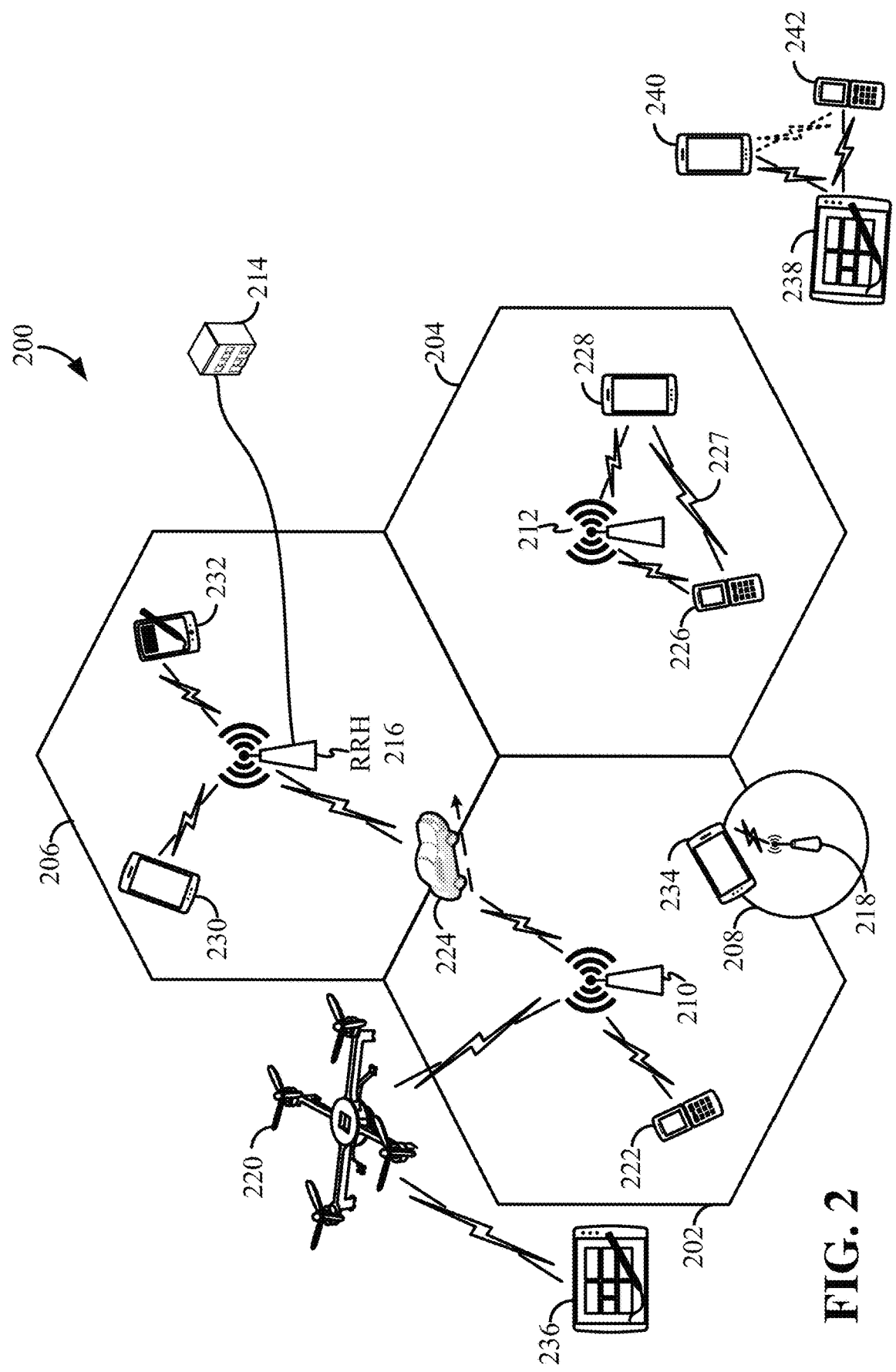
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell.

Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a D2D, P2P, or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, which is not illustrated, but is part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, scheduled entities such as a first scheduled entity 106 and a second scheduled entity 107 may utilize sidelink signals for direct D2D communication. Sidelink signals may include sidelink traffic 113 and sidelink control 115. Sidelink control information 115 may in some examples include a request signal, such as a request-to-send (RTS), a source transmit signal (STS), and/or a direction selection signal (DSS). The request signal may provide for a scheduled entity 106 to request a duration of time to keep a sidelink channel available for a sidelink signal. Sidelink control information 115 may further include a response signal, such as a clear-to-send (CTS) and/or a destination receive signal (DRS). The response signal may provide for the scheduled entity 106 to indicate the availability of the sidelink channel, e.g., for a requested duration of time. An exchange of request and response signals (e.g., handshake) may enable different scheduled entities performing sidelink communications to negotiate the availability of the sidelink channel prior to communication of the sidelink traffic information 113.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of scheduling entities 108 and scheduled entities 106 may include suitable hardware and capabilities (e.g., an encoder, a decoder, and/or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier 1-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the physical (PHY) transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given CP length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
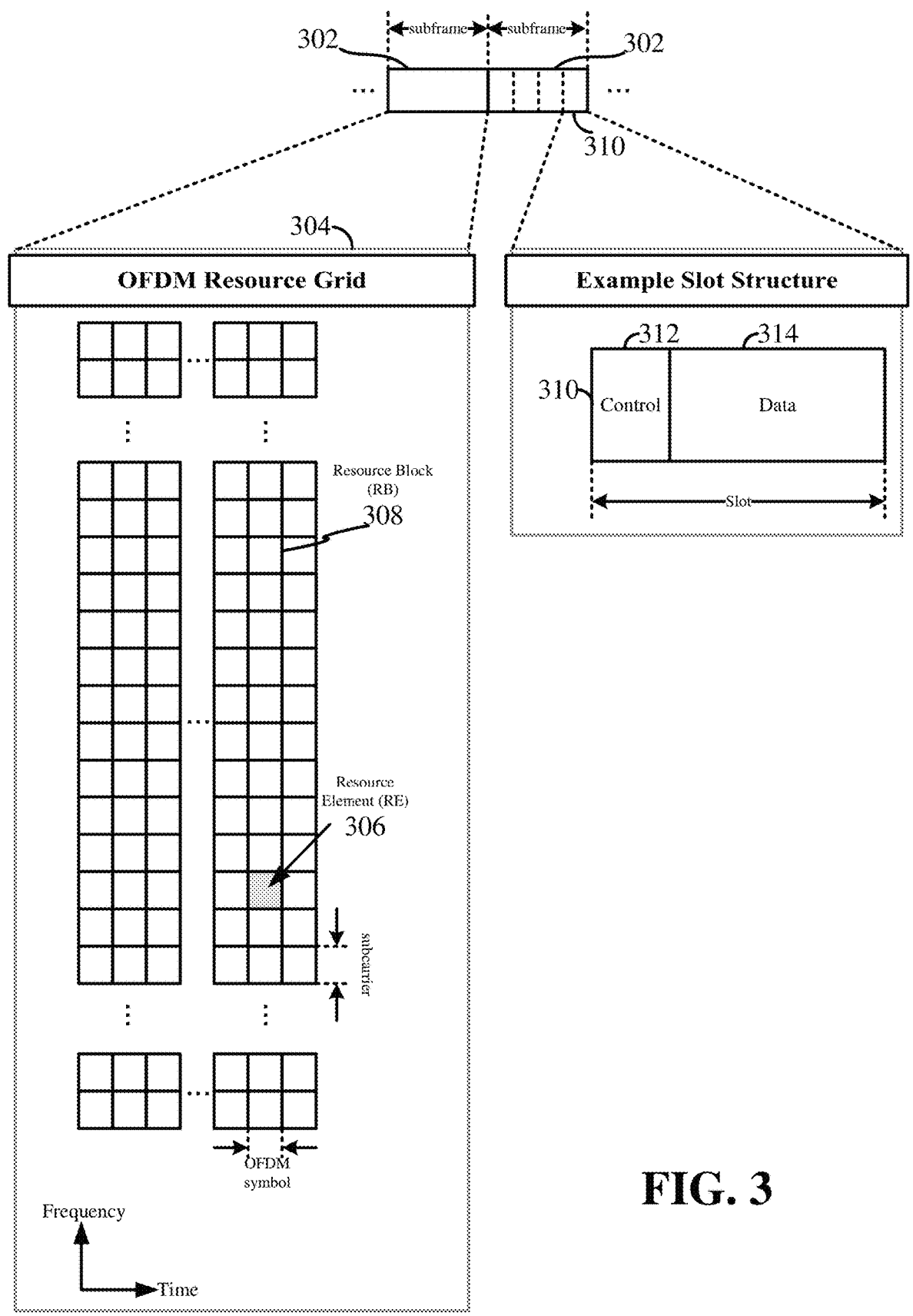
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and CP overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

As previously stated, various aspects disclosed herein are directed towards a UE based network-assisted scheduling for sidelink unicast communications. To this end, it should be noted that the aspects disclosed are specifically applicable to NR vehicle-to-everything (V2X) unicast communications in Mode 3 (i.e., network-assisted V2X resource allocation), although they may similarly apply to other types of sidelink communications. For Mode 3, different mechanisms are applied/chosen depending on the UEs' coverage status. For unicast V2X UEs, the coverage status of the two peer UEs is determined, which could be one of the following situations: the UEs are under the same cell coverage; the UEs are under different cell coverage; or one of the UEs is out-of-coverage. It should also be noted that, because current 3GPP standards do not control the application-layer message contents (e.g, a basic safety message (BSM) broadcast by V2X UEs), enclosing the "cell ID" in a V2X application message is not a feasible solution.

To ascertain the cell coverage of a peer UE, a network-based solution may be used. For instance, a UE may send a request to its own gNB (e.g., via a UMTS (Uu) interface), wherein the gNB then determines the peer UE's cell and corresponding base station to coordinate the resource allocation (e.g., via a Xn interface). With this network-based solution, however, it should be noted that a Mode 4 (i.e., distributed scheduling) resource is not used.

In a proposed solution disclosed herein, preconfigured Mode 4 resources over the LTE-V2X (PC5) interface between peer UEs are used to facilitate autonomous resource selection. Alternatively, Mode 4 resources may also be configured via radio resource control signaling from a UE's gNB (e.g, via SIB (System Information Broadcast)). For instance, sidelink UEs may be configured to exchange information with each other over the PC5 interface before such information is provided to the network as part of a Mode-3 resource request for further communication over PC5. Namely, in a proposed solution disclosed herein, a UE detects the cell coverage status and potential resource scheduling conflict of a peer UE, wherein this information is then provided to the UE's eNB or gNB for Mode 3 scheduling of the sidelink communication. Alternatively, it is contemplated that the UE may use only Mode 4 resources to exchange cell coverage status with a peer UE, wherein the eNB coordinates resource allocation in EUTRAN or NR-RAN with another cell.

In a particular aspect disclosed herein, a pool of resources may be preconfigured for peer UEs to use when exchanging information regarding coverage status. Resource selection may then be a random selection where, for example, a unicast V2X UE listens to all potential resources in the pool so as to avoid missing the coverage indication of a peer UE. Alternatively, resource selection may be based on an algorithm that maps resources based on UE identifiers. Furthermore, with respect to determining the location of a resource (i.e., in time/frequency space), it is contemplated that such determination may be based on the peer UE's layer 2 ID/address, for example, or a combination of the layer 2 ID/address of both UEs.

In the absence of an X2 interface, it should be noted that two base stations cannot communicate with each other. To avoid a Mode 3 resource pool usage conflict, peer UEs are thus relied upon to exchange information (e.g., cell coverage status). For instance, a UE may use a Mode 4 method to bootstrap the Mode 3 resource allocation. A UE may also use a Mode 3 broadcast to perform this initial exchange.

In accordance with an aspect disclosed herein, information exchanged between peer UEs (via PC5) is reported back to a eNB/gNB to assist with scheduling. Such exchanged information may, for example, include cell coverage information, such as a peer UE's E-UTRAN Cell Global Identifier (ECGI), which may be useful for handover purposes, or an out-of-coverage (OOC) indication if the UE is not within any EUTRAN or NR RAN coverage. Exchanged information may also include resources preoccupied by a peer UE, as well as resources not likely to be used by the peer UE's eNB/gNB (e.g., where the eNB/gNB of the peer UE prioritizes resources).

Various details about the information exchange between UEs is also contemplated. For instance, with respect to resources preoccupied or not likely to be used, UEs may be configured to exchange such information only if the UEs are under different cell coverages. The formatting to represent a resource conflict is also contemplated (e.g., where a bitmap or other data structure may be used), as well the manner in which information received from a peer UE is subsequently forwarded to a UE's eNB/gNB (e.g., via radio resource control (RRC) or media access control (MAC) signaling).

A triggering of the information exchange between peer UEs is also contemplated. For instance, such information exchange may be autonomously triggered by a UE or triggered by the network. With respect to a triggering by the network, for example, a UE may first provide a eNB/gNB with a source/destination identifier of the peer UE, which the eNB/gNB may then use to determine whether the peer UE is OOC or under coverage of another cell. If so, the eNB/gNB may then trigger the UE to exchange additional information with the peer UE via a network indication that the peer UE may not be under the same coverage as the UE. The eNB/gNB may trigger the UE to receive coverage status information from the peer UE when the peer UE and the UE have different cell coverage. Conversely, the eNB/gNB may abstain from triggering the UE to receive coverage status information from the peer UE when the peer UE and the UE are under a same cell coverage.

Figure 4:
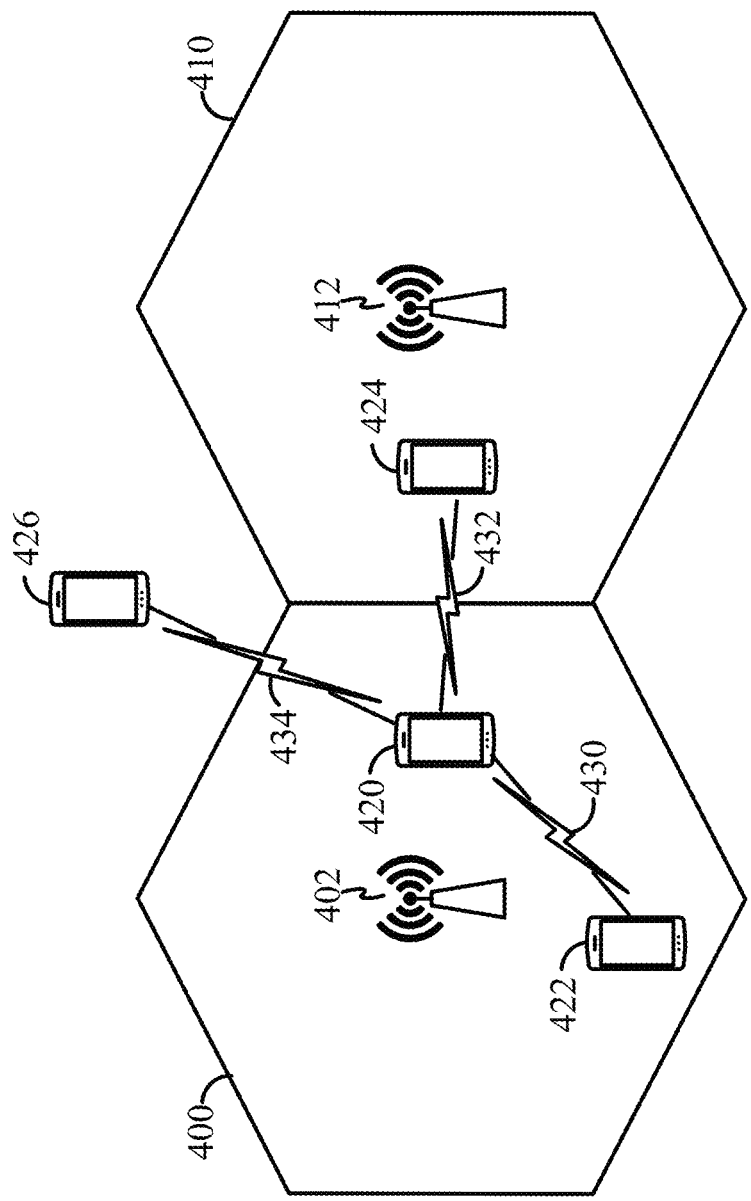
FIG. 4 is a conceptual illustration demonstrating exemplary sidelink communication scenarios in accordance with some aspects of the disclosure.

Referring next to FIG. 4, a conceptual illustration is provided demonstrating exemplary sidelink communication scenarios in accordance with some aspects of the disclosure. As illustrated, for this particular example, it is assumed that a UE 420 is served by eNB/gNB 402 within cell 400, wherein the UE 420 may engage in sidelink communications with either UE 422, 424, or 426. For instance, in a first scenario, UE 420 performs a sidelink communication 430 with UE 422, wherein UE 420 and UE 422 are both served by eNB/gNB 402. In a second scenario, UE 420 performs a sidelink communication 432 with UE 424, wherein UE 424 is in a different cell 410 and served by a different eNB/gNB 412. In a third scenario, UE 420 performs a sidelink communication 434 with a UE 426 that is OOC.

Figure 5:
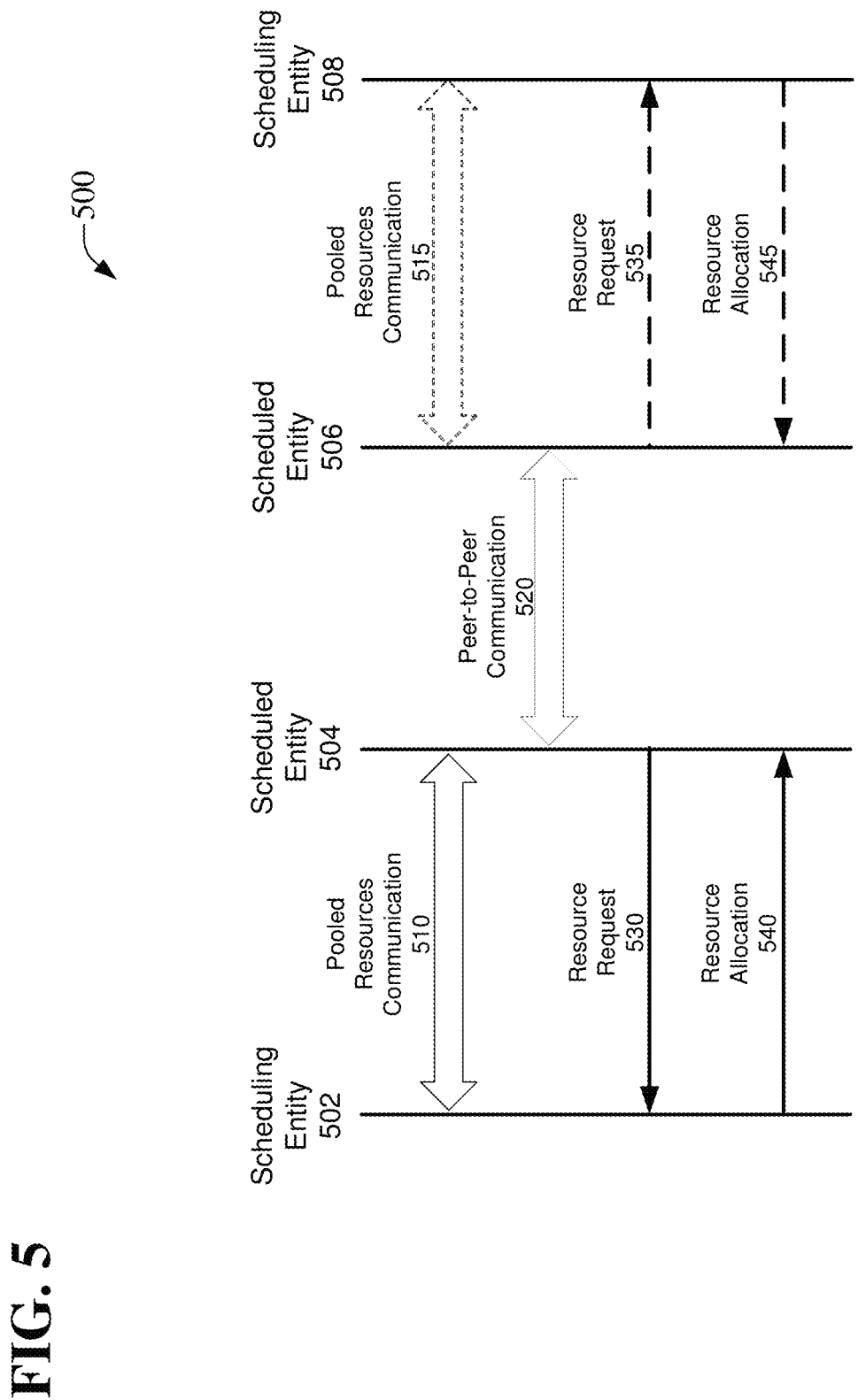
FIG. 5 is a signaling diagram illustrating an exemplary user equipment (UE) based network-assisted scheduling of a sidelink communication in accordance with aspects disclosed herein.
Figure 6:
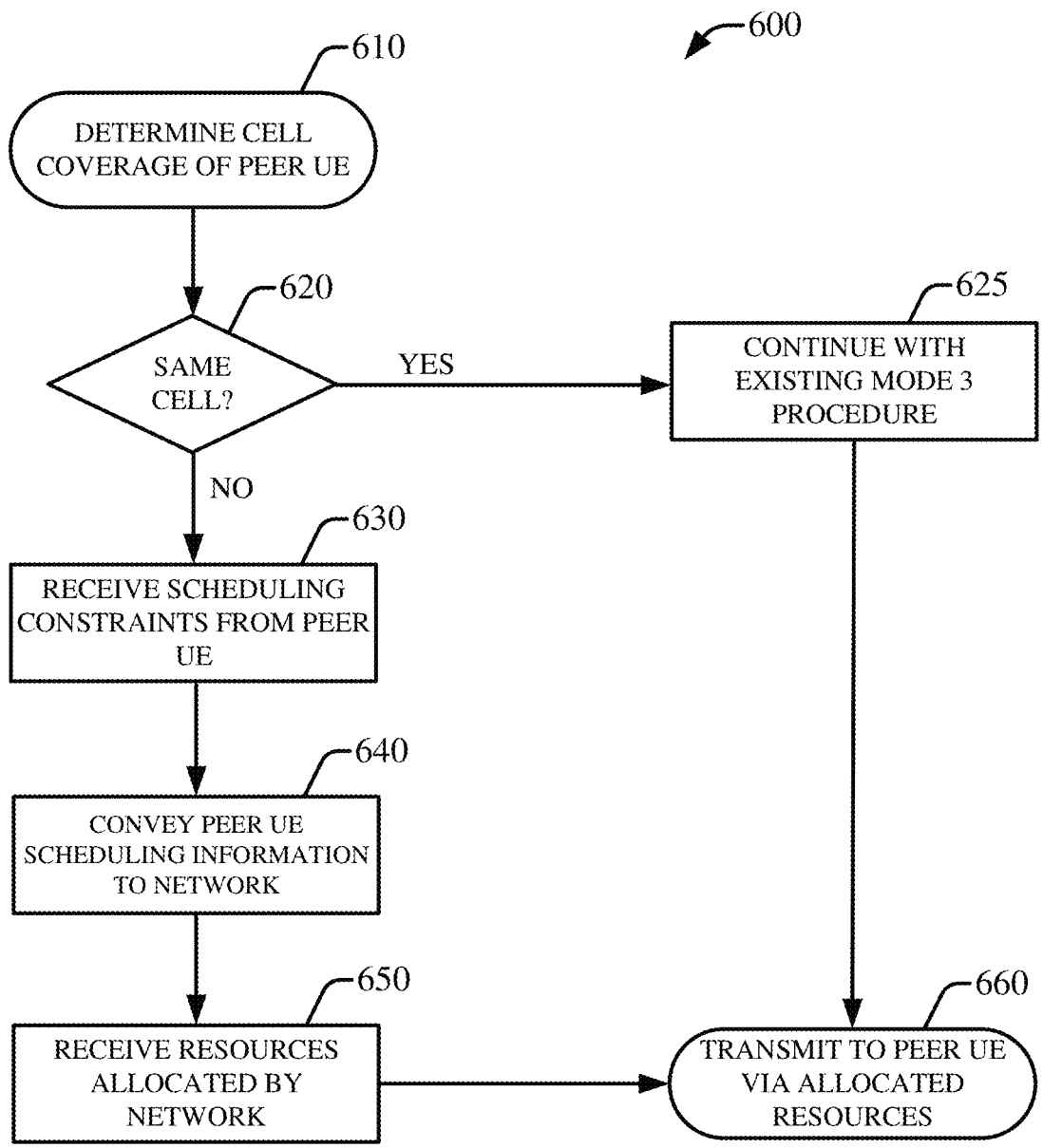
FIG. 6 is a flow chart illustrating an exemplary process for scheduling a sidelink communication in accordance with aspects disclosed herein.

Referring next to FIGS. 5-6, a signaling diagram and flow chart are respectively provided illustrating exemplary UE-based network-assisted schedulings of a sidelink communication in accordance with aspects disclosed herein. With respect to FIG. 5, it should be appreciated that a particular scenario is assumed in which the peer UEs have different cell coverages, such as the sidelink communication 432 between UE 420 and UE 424 illustrated in FIG. 4. Namely, in FIG. 5, a particular signaling diagram 500 is provided in which a first scheduled entity 504 is served by a first scheduling entity 502, whereas a second scheduled entity 506 is served by a second scheduling entity 508.

As illustrated, it contemplated that a scheduling of a sidelink communication between peer UEs (e.g., the first scheduled entity 504 and the second scheduled entity 506) may begin with a pooled resources communication 510 between the first scheduled entity 504 and the first scheduling entity 502. For instance, via such communication 510, the first scheduling entity 502 may configure the first scheduled entity 504 to receive coverage status information from peer UEs via a pool of resources allocated for communications between peer UEs (e.g., a pool of Mode 4 resources). The first scheduled entity 504 may then utilize resources from this pool of resources to facilitate a peer-to-peer communication 520 with the second scheduled entity 506. The first scheduled entity 504 may then provide the first scheduling entity 502 with a resource request 530 (e.g., a Mode 3 resource request), wherein information included in the resource request 530 may include coverage status information received from the second scheduled entity 506 via the peer-to-peer communication 520. For instance, such information may be combined with a buffer status report (BSR) included in the resource request 530, or as part of a new message. The scheduling then concludes with the first scheduling entity 502 providing the first scheduled entity 504 with a resource allocation 540 (e.g., a Mode 3 resource allocation) to facilitate a sideling communication with the second scheduled entity 506.

As illustrated, the signaling diagram 500 may also include a signaling exchange between the second scheduled entity 506 and the second scheduling entity 508, wherein such signaling exchange is substantially similar to the aforementioned signaling exchange between the first scheduled entity 504 and the first scheduling entity 502. Namely, it is contemplated that pooled resources communication 515 is substantially similar to pooled resources communication 510; resource request 535 is substantially similar to resource request 530; and resource allocation 545 is substantially similar to resource allocation 540. It is also contemplated that the signaling exchange between the second scheduled entity 506 and the second scheduling entity 508 may be optional if, for example, the second scheduled entity 506 is only the receiver of a PC5 unicast communication from the first scheduled entity 504.

With respect to FIG. 6, the various acts of process 600 are described herein within the context of UE 420. Process 600 begins at block 610 where UE 420 determines the cell coverage of a peer UE. As illustrated in FIG. 5, such determination may be made via a signaling exchange between UE 420 and a peer UE (e.g., UE 422, 424, or 426) utilizing Mode 4 resources. At block 620, process 600 proceeds with a determination of whether UE 420 and the peer UE have the same cell coverage. If UE 420 and the peer UE have the same cell coverage (e.g., where the peer UE is UE 422), process 600 proceeds to block 625 where a sidelink communication is configured according to existing Mode 3 procedures, and subsequently concludes at block 660 where UE 420 communicates with the peer UE (e.g., sidelink communication 430 with UE 422).

Otherwise, if at block 620 it is determined that UE 420 and the peer UE do not have the same cell coverage (e.g., where the peer UE is UE 424 or UE 426), process 600 proceeds to block 630 where UE 420 receives scheduling constraints from the peer UE (e.g., a whitelist/blacklist of resources). Here, as previously stated, it should be appreciated that UE 420 may be triggered to receive such additional information either autonomously or by the network (i.e., triggered by eNB/gNB 402). After receiving scheduling constraints from the peer UE at block 640, UE 420 forwards the scheduling constraints to the eNB/gNB 402 at block 640 (e.g., via a Mode 3 request, as illustrated in FIG. 5). Process 600 then proceeds to block 650 where UE 420 receives resources allocated by the network from eNB/gNB 402 (e.g., via a Mode 3 allocation, as illustrated in FIG. 5), and subsequently concludes at block 660 where UE 420 communicates with the peer UE (e.g., UE 424 or 426) via a sidelink communication (e.g., sidelink communication 432 or 434) utilizing the resources allocated by the network.

With respect to how information about a peer UE is provided to a eNB/gNB, it should be appreciated that different signaling mechanisms are contemplated. For instance, a UE may utilize RRC signaling, which is large enough to include a white list or black list of resources, for example. To this end, it should be appreciated that an additional RRC message from a UE to a eNB/gNB may be used to convey the scheduling assistance information, given a UE's knowledge about the peer UE's half-duplex timing constraint. Furthermore, it is contemplated that new information elements (IEs) may be created to include, for example, the Layer 2 identifier of the peer UE (or the Radio Network Temporary Identifier (RNTI) previously allocated by the network for this unicast communication); a list of resource locations (e.g., in the time domain); and/or how long information in an IE is valid.

Alternatively, rather than RRC, it is contemplated that MAC signaling may be used. It should be appreciated that a MAC control element (CE) can be adopted if combining scheduling-assisting information with a BSR is desired. If so, because the BSR size is limited, such mechanism may be limited to one or two suggested choices or forbidden resources.

Referring next to FIG. 7, a block diagram is provided illustrating exemplary contents of a BSR, wherein it is contemplated that a BSR may be used to include scheduling-assisting information for Mode 3 grants. To this end, it is noted that a UE can include up to N octets, where each octet indicates an offset in the time domain to schedule or not to schedule. Alternatively, a UE can include a bitmap of the next 32-, 64-, 96-, 128-slots/subframes that contain 0/1 flags for each possible scheduling choice, wherein the size can depend on the packet delay budget for the data reported in this BSR.

In another solution disclosed herein, an X2 interface between eNBs is used to facilitate a Mode 4 bootstrapping technique, as used in LTE networks. For this particular solution, it is contemplated that sidelink signaling is only enhanced to enable the exchange of coverage information. Namely, after a UE discovers that a target peer UE is not in the same cell, it is contemplated that the UE provides the eNB/gNB with the ECGI of the peer UE's eNB/gNB (e.g., via an RRC message). The eNB/gNB of the UE may then coordinate resource allocation in EUTRAN or NR-RAN with the peer UE's eNB/gNB.

In yet another aspect disclosed herein, it is contemplated that information exchanged between peer UEs may be used to facilitate handovers. For instance, it is contemplated that a UE may keep its eNB/gNB updated about the cell identifiers of a peer UE, to facilitate a handover of the UE to another cell, if desired.

Figure 8:
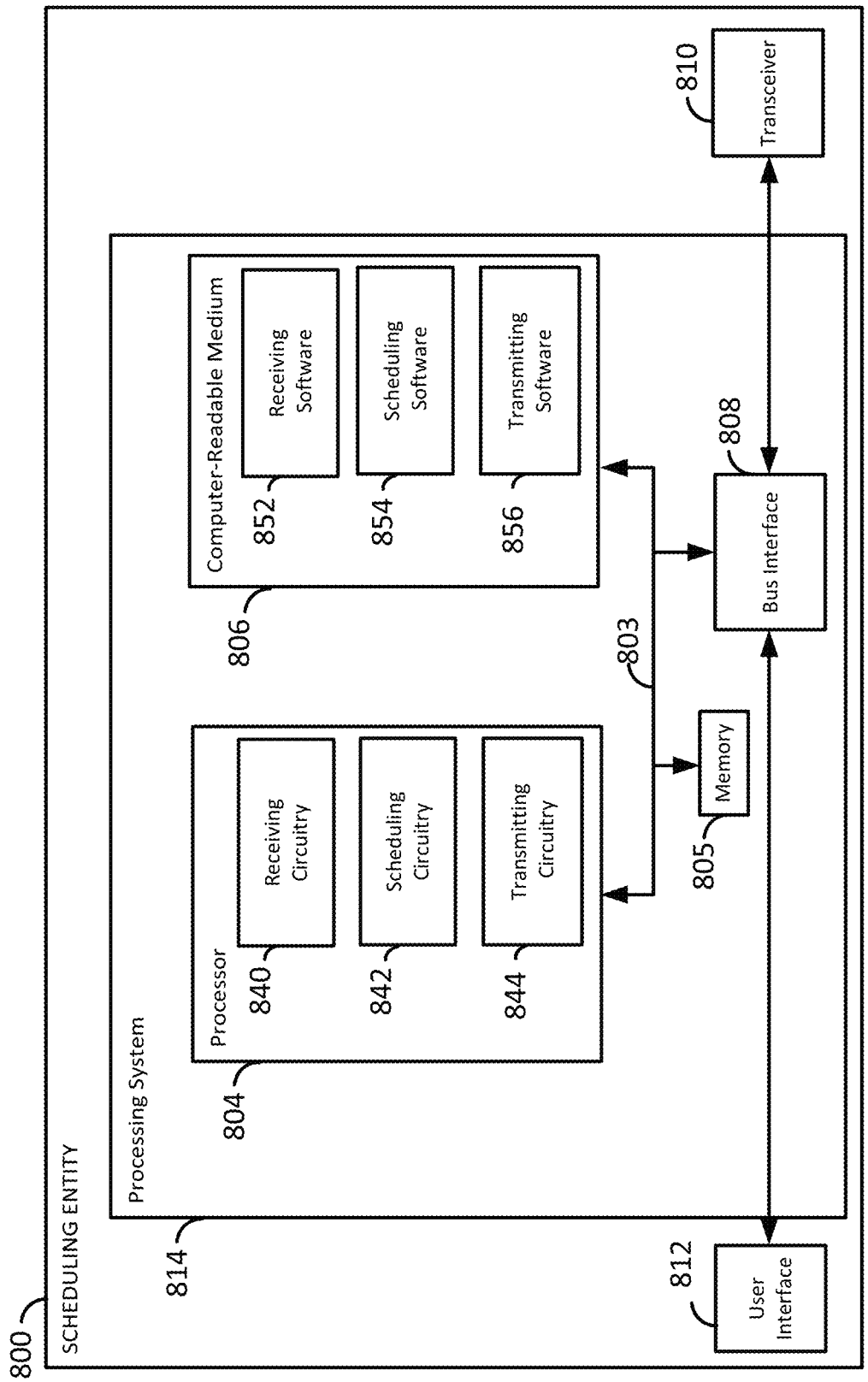
FIG. 8 is a block diagram illustrating an example of a hardware implementation for a scheduling entity employing a processing system in accordance with aspects disclosed herein.

FIG. 8 is a block diagram illustrating an example of a hardware implementation for a scheduling entity 800 employing a processing system 814. For example, the scheduling entity 800 may be a UE as illustrated in any one or more of the FIGS. disclosed herein. In another example, the scheduling entity 800 may be a base station (e.g., a gNB) as also illustrated in any one or more of the FIGS. disclosed herein.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures described below and illustrated in FIG. 9.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

In some aspects of the disclosure, the processor 804 may include a receiving circuitry 840 configured for various functions, including, for example, to receive a coverage status report from a UE (e.g., via RRC or MAC signaling) in which the coverage status report is associated with a peer UE of the UE. As illustrated, the processor 804 may also include a scheduling circuitry 842 configured for various functions. For instance, the scheduling circuitry 842 may be configured to determine a resource scheduling for the UE based on the coverage status report in which the resource scheduling facilitates a sidelink communication between the UE and the peer UE. The processor 804 may further include transmitting circuitry 844 configured for various functions, including, for example, to transmit the resource scheduling to the UE. It should also be appreciated that, the combination of the receiving circuitry 840, the scheduling circuitry 842, and the transmitting circuitry 844 may be configured to implement one or more of the functions described herein.

Various other aspects of scheduling entity 800 are also contemplated. In some implementations, for instance, it is contemplated that scheduling entity 800 may specify which resources a UE shall use to receive coverage status information from a peer UE. For example, in a particular implementation, scheduling entity 800 may configure the UE to receive coverage status information from the peer UE via a pool of resources allocated for communications between the UE and the peer UE.

In another aspect of the disclosure, it is contemplated that scheduling entity 800 may control whether or not a UE shall receive coverage status information from a peer UE. Namely, it is contemplated that scheduling entity 800 may be configured to determine whether to trigger the UE to receive coverage status information from the peer UE. For instance, scheduling entity 800 may be configured to trigger the UE to receive coverage status information from the peer UE when the peer UE and the UE have different cell coverage. When the UE and peer UE have the same cell coverage though, scheduling entity 800 may not need the UE to send coverage status information about the peer UE. Accordingly, scheduling entity 800 may be configured to abstain from triggering the UE to receive coverage status information from the peer UE when the peer UE and the UE are under a same cell coverage.

In another aspect of the disclosure, it is contemplated that scheduling entity 800 may receive scheduling information about the peer UE from the UE, which may further assist with the scheduling performed by scheduling circuitry 842. For instance, it is contemplated that the coverage status report received via receiving circuitry 840 may further comprise resource scheduling information associated with the peer UE, which was received by the UE from the peer UE. The scheduling circuitry 842 may then be configured to determine a resource scheduling for the UE to communicate with the peer UE via sidelink based on the resource scheduling information received by the UE from the peer UE.

Referring back to the remaining components of scheduling entity 800, it should be appreciated that the processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806. The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 806 may include receiving software 852 configured for various functions, including, for example, to receive a coverage status report from a UE (e.g., via RRC or MAC signaling) in which the coverage status report is associated with a peer UE of the UE. As illustrated, the computer-readable storage medium 806 may also include scheduling software 854 configured for various functions. For instance, the scheduling software 854 may be configured to determine a resource scheduling for the UE based on the coverage status report in which the resource scheduling facilitates a sidelink communication between the UE and the peer UE. The computer-readable storage medium 806 may further include transmitting software 856 configured for various functions, including, for example, to transmit the resource scheduling to the UE.

In a particular configuration, it is also contemplated that the scheduling entity 800 includes means for receiving a coverage status report from a UE in which the coverage status report is associated with a peer UE of the UE; means for determining a resource scheduling for the UE based on the coverage status report in which the resource scheduling facilitates a sidelink communication between the UE and the peer UE; and means for transmitting the resource scheduling to the UE. In one aspect, the aforementioned means may be the processor(s) 804 configured to perform the functions recited by the aforementioned means. In another aspect, the aforementioned means may be a circuit or any apparatus configured to perform the functions recited by the aforementioned means.

Figure 9:
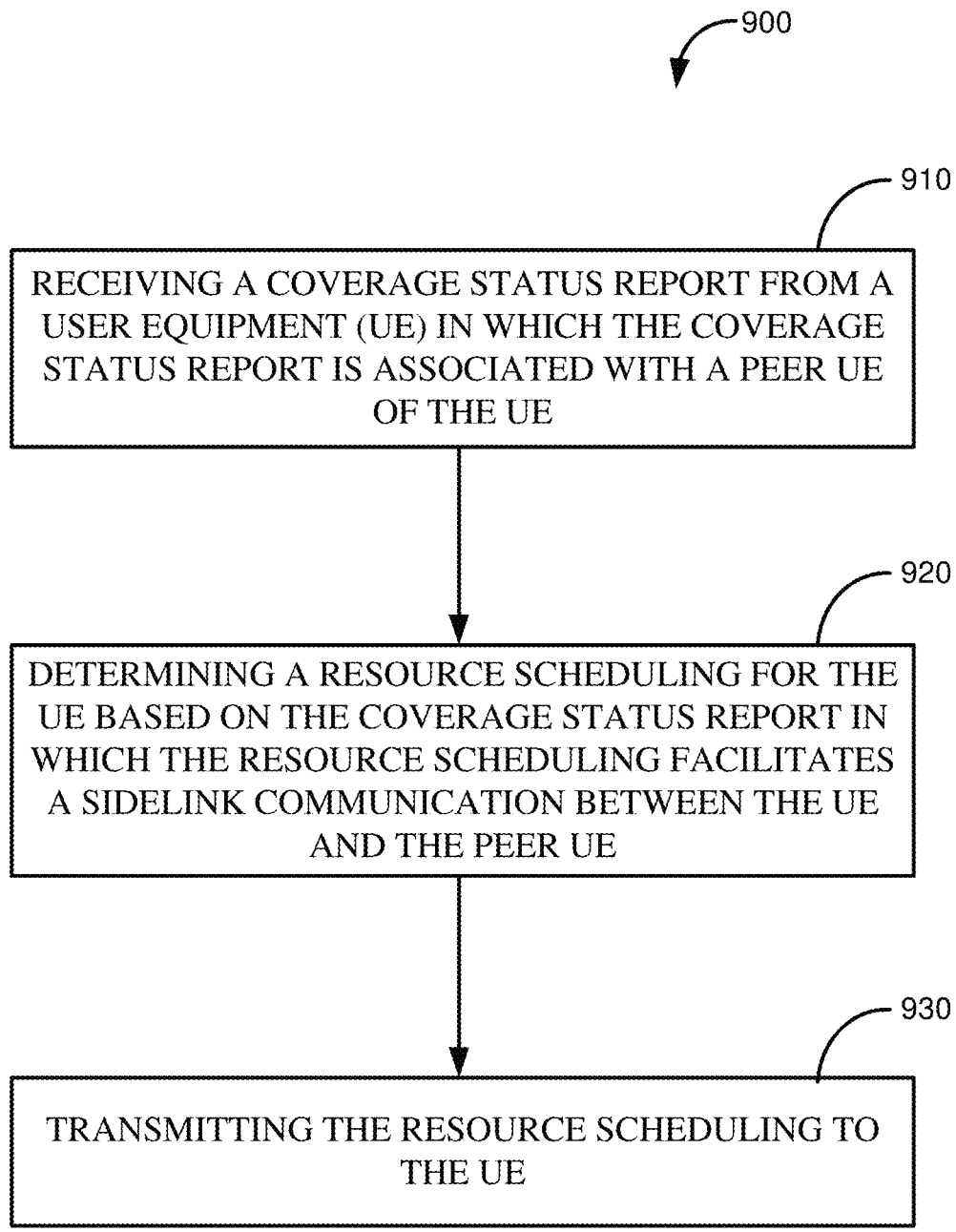
FIG. 9 is a flow chart illustrating an exemplary scheduling entity process that facilitates some aspects of the disclosure.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described herein and utilizing, for example, the processes and/or algorithms described in relation to FIG. 9.

In FIG. 9, a flow chart is provided, which illustrates an exemplary scheduling entity process that facilitates some aspects of the disclosure. As described below, some or all illustrated features may be omitted in a particular implementation within the scope of the present disclosure, and some illustrated features may not be required for implementation of all embodiments. In some examples, the process 900 may be carried out by the scheduling entity 800 illustrated in FIG. 8. In some examples, the process 900 may be carried out by any suitable apparatus or means for carrying out the functions or algorithm described below.

Process 900 begins at block 910 with the scheduling entity 800 (e.g., a gNB) receiving a coverage status report from a UE (e.g., via RRC or MAC signaling) in which the coverage status report is associated with a peer UE of the UE. Process 900 then proceeds to block 920 where the scheduling entity 800 determines a resource scheduling for the UE based on the coverage status report in which the resource scheduling facilitates a sidelink communication between the UE and the peer UE. Process 900 then concludes at block 930 where the scheduling entity 800 transmits the resource scheduling to the UE.

Figure 10:
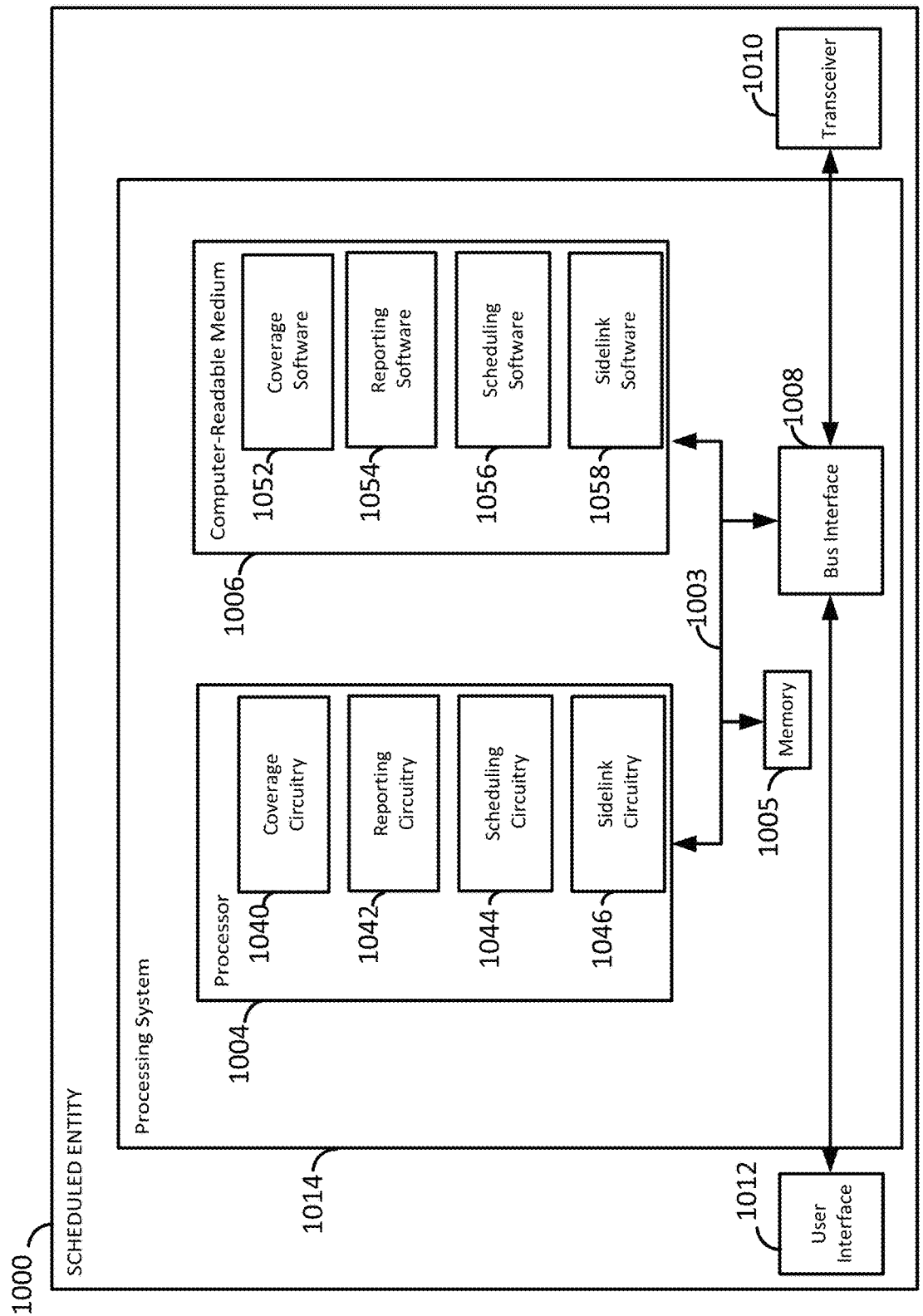
FIG. 10 is a block diagram illustrating an example of a hardware implementation for a scheduled entity employing a processing system in accordance with aspects disclosed herein.

FIG. 10 is a conceptual diagram illustrating an example of a hardware implementation for an exemplary scheduled entity 1000 employing a processing system 1014. In accordance with various aspects of the disclosure, an element, or any portion of an element, or any combination of elements may be implemented with a processing system 1014 that includes one or more processors 1004. For example, the scheduled entity 1000 may be a UE as illustrated in any one or more of the FIGS. disclosed herein.

The processing system 1014 may be substantially the same as the processing system 814 illustrated in FIG. 8, including a bus interface 1008, a bus 1002, memory 1005, a processor 1004, and a computer-readable medium 1006. Furthermore, the scheduled entity 1000 may include a user interface 1012 and a transceiver 1010 substantially similar to those described above in FIG. 8. That is, the processor 1004, as utilized in a scheduled entity 1000, may be used to implement any one or more of the processes described below and illustrated in the various figures.

In some aspects of the disclosure, the processor 1004 may include a coverage circuitry 1040 configured for various functions, including, for example, to receive coverage status information associated with a peer UE from the peer UE. As illustrated, the processor 1004 may also include a reporting circuitry 1042 configured for various functions. For instance, the reporting circuitry 1042 may be configured to transmit a coverage status report associated with the peer UE (e.g., cell identifiers associated with the peer UE) to a network in which the coverage status report is based on the coverage status information received from the peer UE. The processor 1004 may further include a scheduling circuitry 1044 configured for various functions, including, for example, to receive a resource scheduling from the network in response to transmitting the coverage status report. It is also contemplated that the processor 1004 may include a sidelink circuitry 1046 configured for various functions, including, for example, to establish a sidelink communication with the peer UE based on the resource scheduling received from the network. Furthermore, it should be appreciated that, the combination of the coverage circuitry 1040, the reporting circuitry 1042, the scheduling circuitry 1044, and the sidelink circuitry 1046 may be configured to implement one or more of the functions described herein.

Various other aspects for scheduled entity 1000 are also contemplated. For instance, it is contemplated that the coverage circuitry 1040 may be configured to receive the coverage status information from the peer UE via a pool of resources preconfigured for communications with the peer UE. In another aspect of the disclosure, it is contemplated that the coverage circuitry 1040 may be configured to receive the coverage status information in response to a trigger provided by the network. In yet another aspect of the disclosure, it is contemplated that the coverage circuitry 1040 may be configured to receive resource scheduling information associated with the peer UE from the peer UE, wherein the coverage status report further comprises the resource scheduling information received from the peer UE.

In another aspect disclosed herein, it is contemplated that the reporting circuitry 1042 may be configured to transmit the coverage status report associated with the peer UE to the network in various ways. For instance, in a particular aspect disclosed herein, the reporting circuitry 1042 may be configured to transmit the coverage status report to the network via RRC signaling. When utilizing RRC signaling, the reporting circuitry 1042 may be further configured to transmit at least one of a white list of resources available to the peer UE or a black list of resources unavailable to the peer UE. Alternatively, the reporting circuitry 1042 may be configured to transmit the coverage status report via MAC signaling, wherein the reporting circuitry 1042 may be further configured to transmit a BSR that includes resource scheduling information associated with the peer UE.

Referring back to the remaining components of scheduled entity 1000, similar to processor 804, processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006. Similar to computer-readable medium 806, computer-readable medium 1006 may be a non-transitory computer-readable medium comprising characteristics that are substantially similar. The computer-readable medium 1006 may reside in the processing system 1014, external to the processing system 1014, or distributed across multiple entities including the processing system 1014. It should also be appreciated that, similar to computer-readable medium 806, computer-readable medium 1006 may be embodied in a computer program product comprising characteristics that are substantially similar.

In one or more examples, the computer-readable storage medium 1006 may include coverage software 1052 configured for various functions, including, for example, to receive coverage status information associated with a peer UE from the peer UE. As illustrated, the computer-readable medium 1006 may also include reporting software 1054 configured for various functions. For instance, the reporting software 1054 may be configured to transmit a coverage status report to a network (e.g., via RRC or MAC signaling) in which the coverage status report is associated with the peer UE and based on the coverage status information received from the peer UE. The computer-readable medium 1006 may further include scheduling software 1056 configured for various functions, including, for example, to receive a resource scheduling from the network in response to transmitting the coverage status report. It is also contemplated that the computer-readable medium 1006 may include sidelink software 1058 configured for various functions, including, for example, to establish a sidelink communication with the peer UE based on the resource scheduling received from the network. Furthermore, it should be appreciated that, the combination of the coverage software 1052, the reporting software 1054, the scheduling software 1056, and the sidelink software 1058 may be configured to implement one or more of the functions described herein.

In a particular configuration, it is also contemplated that the scheduled entity 1000 includes means for receiving coverage status information associated with a peer UE from the peer UE; means for transmitting a coverage status report to a network in which the coverage status report is associated with the peer UE and based on the coverage status information received from the peer UE; means for receiving a resource scheduling from the network in response to transmitting the coverage status report; and means for establishing a sidelink communication with the peer UE based on the resource scheduling received from the network. In one aspect, the aforementioned means may be the processor(s) 1004 configured to perform the functions recited by the aforementioned means. In another aspect, the aforementioned means may be a circuit or any apparatus configured to perform the functions recited by the aforementioned means.

Figure 11:
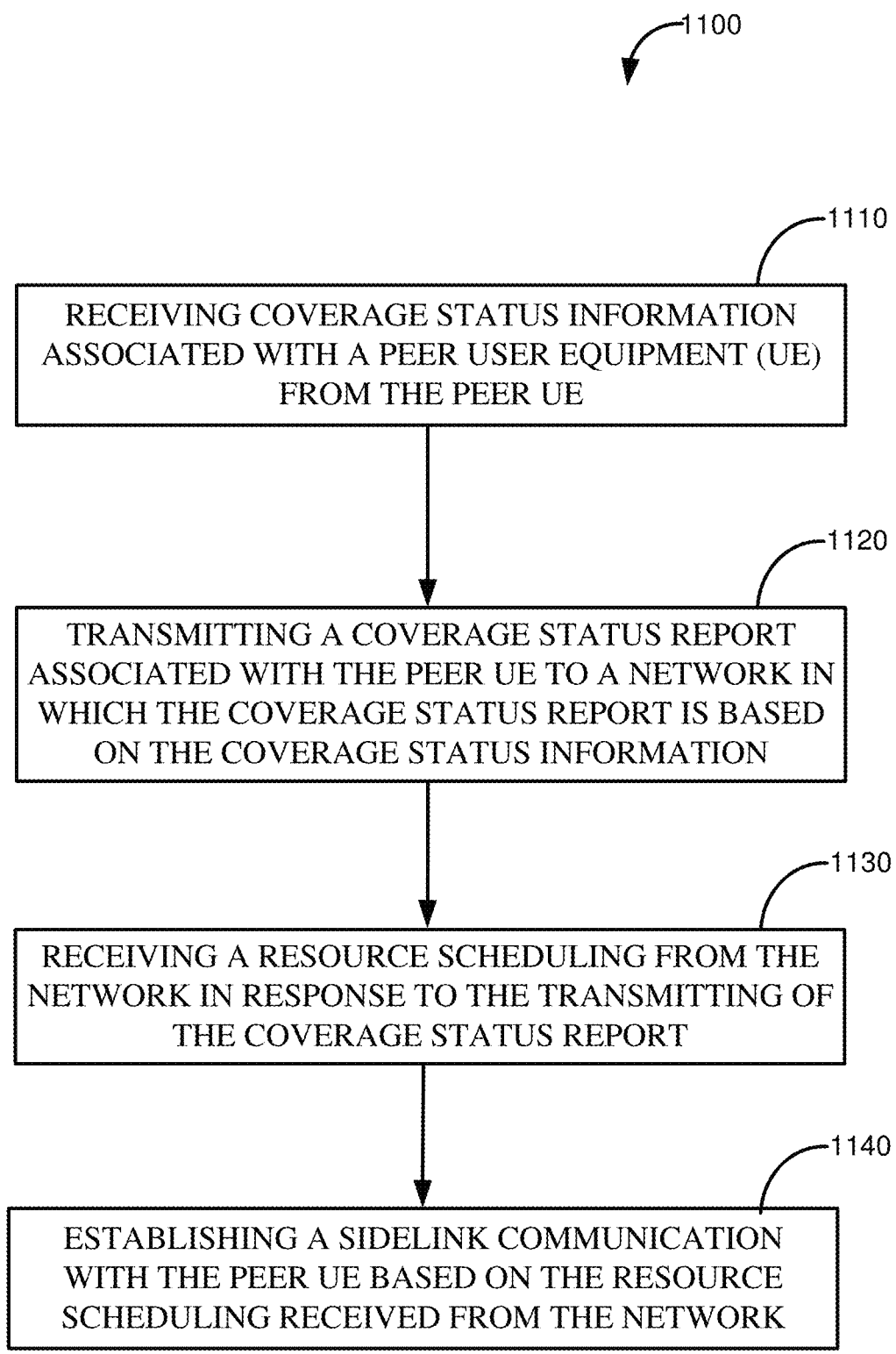
FIG. 11 is a flow chart illustrating an exemplary scheduled entity process that facilitates some aspects of the disclosure.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described herein, and utilizing, for example, the processes and/or algorithms described in relation to FIG. 11.

In FIG. 11, a flow chart is provided, which illustrates an exemplary scheduled entity process for performing some aspects of the disclosure. As described below, some or all illustrated features may be omitted in a particular implementation within the scope of the present disclosure, and some illustrated features may not be required for implementation of all embodiments. In some examples, the process 1100 may be carried out by the scheduled entity 1000 illustrated in FIG. 10. In some examples, the process 1100 may be carried out by any suitable apparatus or means for carrying out the functions or algorithm described below.

Process 1100 begins at block 1110 with the scheduled entity 1000 receiving coverage status information associated with a peer UE from the peer UE. At block 1120, process 1100 continues with the scheduled entity 1000 transmitting a coverage status report to a network in which the coverage status report is associated with the peer UE and based on the coverage status information at block 1120. Process 1100 then proceeds to block 1130 where the scheduled entity 1000 receives a resource scheduling from the network in response to the transmitting of the coverage status report. Process 1100 then concludes at block 1140 where the scheduled entity 1000 establishes a sidelink communication with the peer UE based on the resource scheduling received from the network.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as LTE, the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a scheduled entity, comprising:
   receiving coverage status information associated with a peer user equipment (UE) from the peer UE, the coverage status information comprising resource scheduling information associated with the peer UE;
   transmitting a coverage status report associated with the peer UE to a network, wherein the coverage status report is based on the coverage status information received from the peer UE;
   receiving a resource scheduling from the network in response to the transmitting of the coverage status report; and
   establishing a sidelink communication with the peer UE based on the resource scheduling received from the network.

2. The method of claim 1, wherein the receiving of the coverage status information comprises receiving the coverage status information from the peer UE via a pool of resources preconfigured for communications with the peer UE.

3. The method of claim 1, wherein the receiving of the coverage status information is triggered by the network.

4. The method of claim 1, wherein the coverage status report further comprises the resource scheduling information received from the peer UE.

5. The method of claim 1, wherein the transmitting is performed via radio resource control (RRC) signaling.

6. The method of claim 5, wherein the transmitting comprises transmitting at least one of a white list of resources available to the peer UE or a black list of resources unavailable to the peer UE.

7. The method of claim 1, wherein the transmitting is performed via media access control (MAC) signaling.

8. The method of claim 7, wherein the transmitting further comprises transmitting a buffer status report (BSR) that includes the resource scheduling information associated with the peer UE.

9. The method of claim 1, wherein the transmitting further comprises transmitting cell identifiers associated with the peer UE to the network.

10. A scheduled entity for wireless communication comprising:
   a coverage circuitry configured to receive coverage status information associated with a peer user equipment (UE) from the peer UE, the coverage status information comprising resource scheduling information associated with the peer UE;
   a reporting circuitry configured to transmit a coverage status report associated with the peer UE to a network, wherein the coverage status report is based on the coverage status information received from the peer UE;
   a scheduling circuitry configured to receive a resource scheduling from the network in response to transmitting the coverage status report; and
   a sidelink circuitry configured to establish a sidelink communication with the peer UE based on the resource scheduling received from the network.

11. The scheduled entity of claim 10, wherein the coverage circuitry is configured to receive the coverage status information from the peer UE via a pool of resources preconfigured for communications with the peer UE.

12. The scheduled entity of claim 10, wherein the coverage circuitry is triggered by the network to receive the coverage status information from the peer UE.

13. The scheduled entity of claim 10, wherein the reporting circuitry is configured to include the resource scheduling information in the coverage status report.

14. The scheduled entity of claim 10, wherein the reporting circuitry is configured to transmit the coverage status report via radio resource control (RRC) signaling.

15. The scheduled entity of claim 10, wherein the reporting circuitry is configured to transmit the coverage status report via media access control (MAC) signaling.

16. A method of wireless communication operable at a scheduling entity, comprising:
   receiving a coverage status report from a user equipment (UE), wherein the coverage status report is associated with a peer UE of the UE, the coverage status report comprising resource scheduling information associated with the peer UE received by the UE;
   determining a resource scheduling for the UE based on the coverage status report, wherein the resource scheduling facilitates a sidelink communication between the UE and the peer UE; and
   transmitting the resource scheduling to the UE.

17. The method of claim 16, further comprising configuring the UE to receive coverage status information from the peer UE via a pool of resources allocated for communications between the UE and the peer UE.

18. The method of claim 16, further comprising determining whether to trigger the UE to receive coverage status information from the peer UE.

19. The method of claim 18, further comprising triggering the UE to receive coverage status information from the peer UE when the peer UE and the UE have different cell coverage.

20. The method of claim 18, further comprising abstaining from triggering the UE to receive coverage status information from the peer UE when the peer UE and the UE are under a same cell coverage.

21. The method of claim 16, wherein the determining is further based on the resource scheduling information received by the UE from the peer UE.

22. The method of claim 16, wherein the receiving comprises receiving the coverage status report via radio resource control (RRC) signaling.

23. The method of claim 16, wherein the receiving comprises receiving the coverage status report via media access control (MAC) signaling.

24. A scheduling entity for wireless communication comprising:
   a receiving circuitry configured to receive a coverage status report from a user equipment (UE), wherein the coverage status report is associated with a peer UE of the UE, the coverage status report comprising resource scheduling information associated with the peer UE received by the UE;
   a scheduling circuitry configured to determine a resource scheduling for the UE based on the coverage status report, wherein the resource scheduling facilitates a sidelink communication between the UE and the peer UE; and
   a transmitting circuitry configured to transmit the resource scheduling to the UE.

25. The scheduling entity of claim 24, wherein the scheduling circuitry is further configured to determine whether to trigger the UE to receive coverage status information from the peer UE.

26. The scheduling entity of claim 25, wherein the scheduling circuitry is further configured to trigger the UE to receive coverage status information from the peer UE when the peer UE and the UE have different cell coverage.

27. The scheduling entity of claim 25, wherein the scheduling circuitry is further configured to abstain from triggering the UE to receive coverage status information from the peer UE when the peer UE and the UE are under a same cell coverage.

28. The scheduling entity of claim 24, further configured to configure the UE to receive coverage status information from the peer UE via a pool of resources allocated for communications between the UE and the peer UE.

29. The scheduling entity of claim 24, wherein the receiving circuitry is configured to receive the coverage status report via radio resource control (RRC) signaling.

30. The scheduling entity of claim 24, wherein the receiving circuitry is configured to receive the coverage status report via media access control (MAC) signaling.

\* \* \* \* \*